US011580126B1

(12) United States Patent
Sultania et al.

(10) Patent No.: US 11,580,126 B1
(45) Date of Patent: Feb. 14, 2023

(54) SYSTEMS, APPARATUSES, AND METHODS FOR REQUEST THROTTLING

(71) Applicant: Amazon Technologies, Inc., Seattle, WA (US)

(72) Inventors: Ankit Sultania, Seattle, WA (US); Eric Brian Ceres, Glen Rock, NJ (US); Karthik Saligrama Shreeram, Seattle, WA (US); Yong Yuan, Mercer Island, WA (US); Saurabh Kumar Singh, Sammamish, WA (US); Priyank Mundra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 221 days.

(21) Appl. No.: 16/915,544

(22) Filed: Jun. 29, 2020

(51) Int. Cl.
*G06F 16/2458* (2019.01)
*G06F 16/23* (2019.01)
*G06F 16/93* (2019.01)
*G06F 16/22* (2019.01)
*G06F 16/242* (2019.01)

(52) U.S. Cl.
CPC .......... *G06F 16/2477* (2019.01); *G06F 16/22* (2019.01); *G06F 16/2379* (2019.01); *G06F 16/2443* (2019.01); *G06F 16/93* (2019.01)

(58) Field of Classification Search
CPC .. G06F 16/22; G06F 16/2477; G06F 16/2379; G06F 16/93; G06F 16/2443
See application file for complete search history.

(56) References Cited

U.S. PATENT DOCUMENTS

| 9,674,729 B2* | 6/2017 | Ketheesan | H04W 28/0268 |
| 11,323,373 B2* | 5/2022 | Thanasekaran | G06F 3/0613 |
| 2020/0192706 A1* | 6/2020 | Huus | G06F 16/245 |

* cited by examiner

*Primary Examiner* — Marcin R Filipczyk
(74) *Attorney, Agent, or Firm* — Nicholson De Vos Webster & Elliott, LLP

(57) ABSTRACT

Techniques for request throttling in a provider network environment are described. A throttle handler controls whether requests will be processed through maintaining a token-based record, per type of request, having a token value indicative of a number of requests that can be processed over a time period. For a request, the token value of the token-based record corresponding to the request type is updated based on calculating an elapsed time between a last update time of the token-based record and the current time, calculating an intermediate token value as the existing token value plus a value of the elapsed time multiplied by a rate, and updating the token value to be the minimum between the intermediate token value and a burst value. The request is serviced when the updated token value is determined to be greater than or equal to a number of tokens needed to perform the request.

20 Claims, 12 Drawing Sheets

| FIELD NAME | CONTENT |
|---|---|
| KEY 501 | KEY (STRING) |
| TOKEN VALUE 503 | MAXIMUM OF BURST VALUE (INTEGER OR FLOAT) |
| LAST UPDATE TIME 505 | LAST UPDATE TIME OF THIS RECORD |
| KEY EXPIRATION 506 | EXPIRATION OF KEY |
| CAPACITY UNIT 507 | MAXIMUM LIMIT OF THE QUOTA |
| QUOTA EXPIRATION 509 | TIME FOR QUOTA EXPIRATION |

SYSTEMS, APPARATUSES, AND METHODS FOR REQUEST THROTTLING

BACKGROUND

Enterprises are generating more data than ever before. Trying to find what data is relevant from that generated data is a non-trivial task. Traditional search solutions rely on keyword-based document analysis to find specific terms in the data which is a general-purpose approach inherently limited by its inability to "understand" the content at a more granular level.

BRIEF DESCRIPTION OF DRAWINGS

Various embodiments in accordance with the present disclosure will be described with reference to the drawings, in which:

FIG. 5 illustrates embodiments of a token bucket record.

DETAILED DESCRIPTION

Embodiments of the present disclosure relate to methods, apparatus, systems, and non-transitory computer-readable storage media for throttling for lower transaction rates in a provider network environment.

In some existing systems, embedded distributed throttling is used where each host in the fleet talks to other hosts to ensure that a set throttling burst value and a set rate values are honored at the fleet level. It works based on a token bucket algorithm where tokens are filled in a bucket based at the defined rate and the requests are let through if there are enough tokens in the bucket to allow so. Unfortunately, there are times when the set throttling rate limits are not honored, especially for calls that have a lower burst and rate (e.g., a burst of 1 and rate of 0.5).

In some embodiments, the throttling is applied to a low transaction per second (TPS) query service. This service acquires text from the documents to be extracted and indexed, etc. to make them searchable using term-based or question-based queries. These text-based documents including frequently asked questions (FAQs) are to be searched according to a user query for one or more top ranked (most relevant) documents, one or more top ranked passages (where a passage is a limited number of contiguous lines that have been extracted from a given document), and/or one or more top ranked FAQs. However, document search queries are not typically a high TPS event.

Detailed herein are embodiments of a throttling approach for lower TPS activities. Throughout this description the throttling approach is couched in the context of an enterprise search service that enables users to intuitively search unstructured data using natural language. This service returns specific and personalized answers to questions, giving end users an experience that comes closer to interacting with a human expert. Note that the throttling techniques detailed herein a more broadly applicable to at least other lower TPS services.

Figure 1:
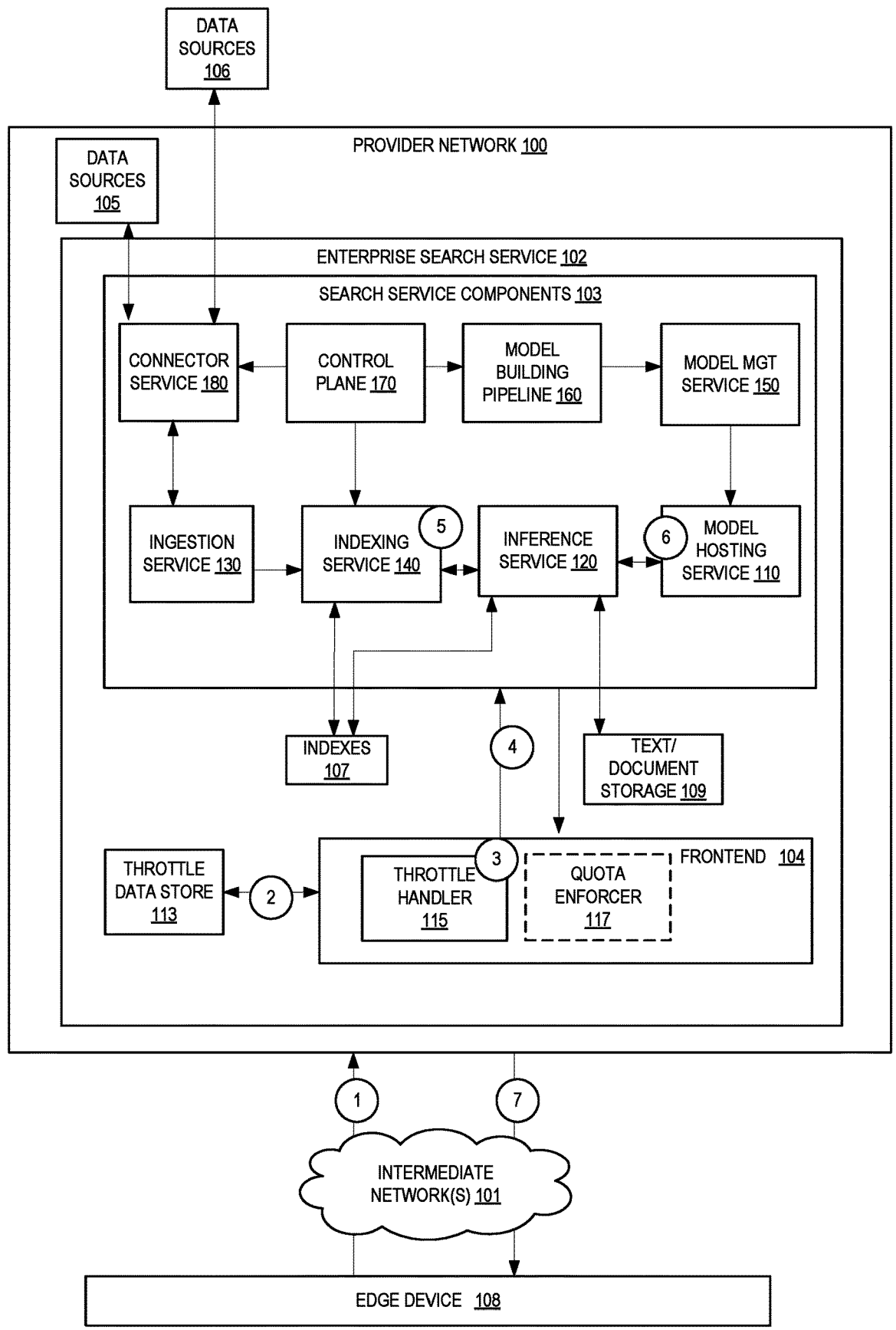
FIG. 1 illustrates embodiments of an enterprise search service with low TPS throttling.

FIG. 1 illustrates embodiments of an enterprise search service with low TPS throttling. The enterprise search service 102 allows for the querying or searching of documents and/or proper subsets thereof of an enterprise using one or more machine learning models. Details of various aspects of this enterprise search service 102 are discussed below. Prior to any searching, the documents and/or proper subsets thereof have been ingested prior to such querying. In some embodiments, the enterprise search service 102 provides the capability to ingest documents from data sources 105 internal to a provider network 100 and data sources 106 external to the provider network 100 (e.g., stored at a third-party location, stored locally, etc.).

An ingestion service 130 allows for the ingestion of documents into the enterprise search service 102. Documents may be pulled from data sources (e.g., in response to a request) and/or pushed from data sources (e.g., a synchronization of when a document is added or altered). The ingestion service 130 may also fetch access control lists (ACLs) associated with the documents. The ACLs can be used to determine if a search result is allowed to be served.

To get documents from the data sources 105 or 106, the ingestion service couples to a connector service 180 which offers a plurality of connectors to connect to different data sources and receive data (as a push or a pull) from those sources according to the appropriate protocol for a particular data source. Note that different data sources may use different transmission protocols, storage protocols, encryption protocols, etc.

The data connectors of the connector service 180 are configured using a control plane 170. This control plane 170 contains workflows for resource management of the enterprise search service 102. The control plane 170 may also be used to configure a model building pipeline 160 which builds specific models, vocabularies, and embeddings to be hosted in the model hosting service 110 and used in answering a query. Note that in some embodiments, a model management service 150 may be used to refresh a given model.

The ingestion service 130 also extracts text from documents, pre-processes the extracted text (e.g., tokenize, normalize, and/or remove noise), and calls an indexing service to generate index entries for text, and causes the documents (or subset thereof) to be stored. The indexing service 140 indexes documents that have been acquired by the ingestion service 130 into one or more indexes 107. An index is a data structure of organized data that maps the data to a plurality of fields. Each document or subset of a document (e.g., passage) is identified with a unique identifier. In some embodiments, the index is comprised a plurality of JSON documents.

In some embodiments, the index is an inverted index that lists every unique word that appears in any document and identifies all of the documents each word occurs in. An index can be thought of as an optimized collection of documents and each document is a collection of fields, which are the key-value pairs that contain data. Each indexed field has a dedicated, optimized data structure. For example, text fields are stored in inverted indices, and numeric and geo fields are stored in BKD trees.

The indexing service 140 may be schema-less, which means that documents can be indexed without explicitly specifying how to handle each of the different fields that might occur in a document. When dynamic mapping is enabled, the indexing service 140 automatically detects and adds new fields to the index. However, as noted below, a schema of reserved fields may be used to map detected data into datatypes. The reserved fields allow for the distinguishing between full-text string fields and exact value string fields, performing language-specific text analysis, optimizing fields for partial matching, and/or the use datatypes that are not automatically detected.

Once a set of documents has been indexed, a query against that set of documents may be made via an inference service 120. The inference service 120 handles search queries from end users by performing query understanding (query classification and enrichment), invoking the indexing service 140 to get a relevant set of documents for the query, retrieving the relevant set of documents, and invoking one or more models of the model hosting service 110 to deduce a search result for given query.

Examples of models utilized by the inference service 120 that are run in the model hosting service 110 include, but are not limited to a question/answer (e.g., reading comprehension) model which extracts answers from passages, a document/passage ranking model which sorts documents in an order of relevance with respect to the query, and a FAQ matching model which attempts to identify a correct the right answer for a given question from a given FAQ document.

A frontend 104 of the enterprise search service 103 couples to one or more search service components 103 to provide a way for external communications (e.g., from edge device 108, etc.) with the enterprise search service 102. For example, through the frontend 104 a user may communicate with the ingestion service 130 to configure and start an ingestion of one or more documents, provide a query to be served by the inference service 120, etc.

While the enterprise search service 102 could be configured to use resources that allow for all requests to be serviced, that configuration may be prohibitively expensive in power, etc. and takes those resources away from other services. For example, the enterprise search service 102 could be configured to have enough compute and network resources to handle almost any level of search query, but that would take away those shared resources from other services.

As such, as shown, in some embodiments, the frontend 104 includes a throttle handler 115 which controls how requests are throttled. In other embodiments, the throttle handler 115 is a part of the throttle data store 113. In some embodiments, the data store 113 is an in-memory key-value data store.

For example, the throttle handler 115 can deny a request when there is no capacity or allow a request when there is capacity. In some embodiments, the throttle handler 115 implements a token bucket-based algorithm to control throttling. The "bucket" is large enough to hold the number of tokens denoted by a burst value (a number of requests allowed over a given time period such as a second) and gains new tokens at a specified rate. Each request removes at least a portion of a token from the bucket. Using a token bucket allows APIs that support a steady stream of requests with the capability to accommodate the occasional burst. In some embodiments, when there is a denial, a message is sent in the form of a HTTP 429 status code ("Too Many Requests").

The frontend 104 couples to a throttle data store 113 that stores throttle token bucket records per throttling key. Typically, there is a throttling key per API request type (denoted by operation name) for a given account and/or index ID. For example, an exemplary key has a format of <accountID><indexID><operationName>. A token bucket record also includes a token value and an indication of when the record was updated.

In some embodiments, the frontend 104 includes a quota enforcer to enforce how many requests are allowed over a time period such as a day, week, or month. In some embodiments, the enterprise search service 103 provides resources for an index in capacity units. Each capacity unit provides additional resources for the index. There are separate capacity units for storage and for queries. In some embodiments, the throttle data store 113 includes a quota record having quota key which may information akin to the throttling key, but does include a value for a consumed capacity. This capacity may be per API request type, client, etc. In some embodiments, the content of the quota key (namely the consumed capacity) is stored as a part of a token bucket record.

As shown, in some embodiments the enterprise search service 102 is a service provided by a provider network 100. The provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 101 (e.g., the internet) via one or more interface(s), such as through use of application programming interface (API) calls, via a console implemented as a website or application, etc. The interface(s) may be part of, or serve as a front-end to, a control plane (e.g., control plane 170) of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region may be a geographical area in which the cloud provider clusters data centers. Each region can include multiple (e.g., two or more) availability zones (AZs) connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

Circles with numbers inside of them represent exemplary actions that may be taken for performing an inference (query). At circle 1, an inference request is sent by an edge device 108 to the enterprise search service 102.

The frontend 104 determines if the request should be handled. At circle 2, the throttle handler 115 interacts with the throttle data store 113 to retrieve a token bucket record associated with the request type. At circle 3, the throttle handler 115 makes a determination that the request can be serviced.

The frontend 104 calls the inference service which begins processing the request at circle 4.

The processing of the request includes accessing one or more indexes 107 via the indexing service 140 at circle 5 to get identifiers of sets of documents to analyze, accessing the identified sets of documents (or text thereof) from document storage 109, and providing the documents (or text thereof) and the query to one or more machine learning models in the model hosting service 110 at circle 6 to determine one or more of top documents, a top passage, and/or a top FAQ.

The result of the determination by the one or more machine learning models is provided the requestor at circle 7 (subject to any restrictions).

Figure 2:
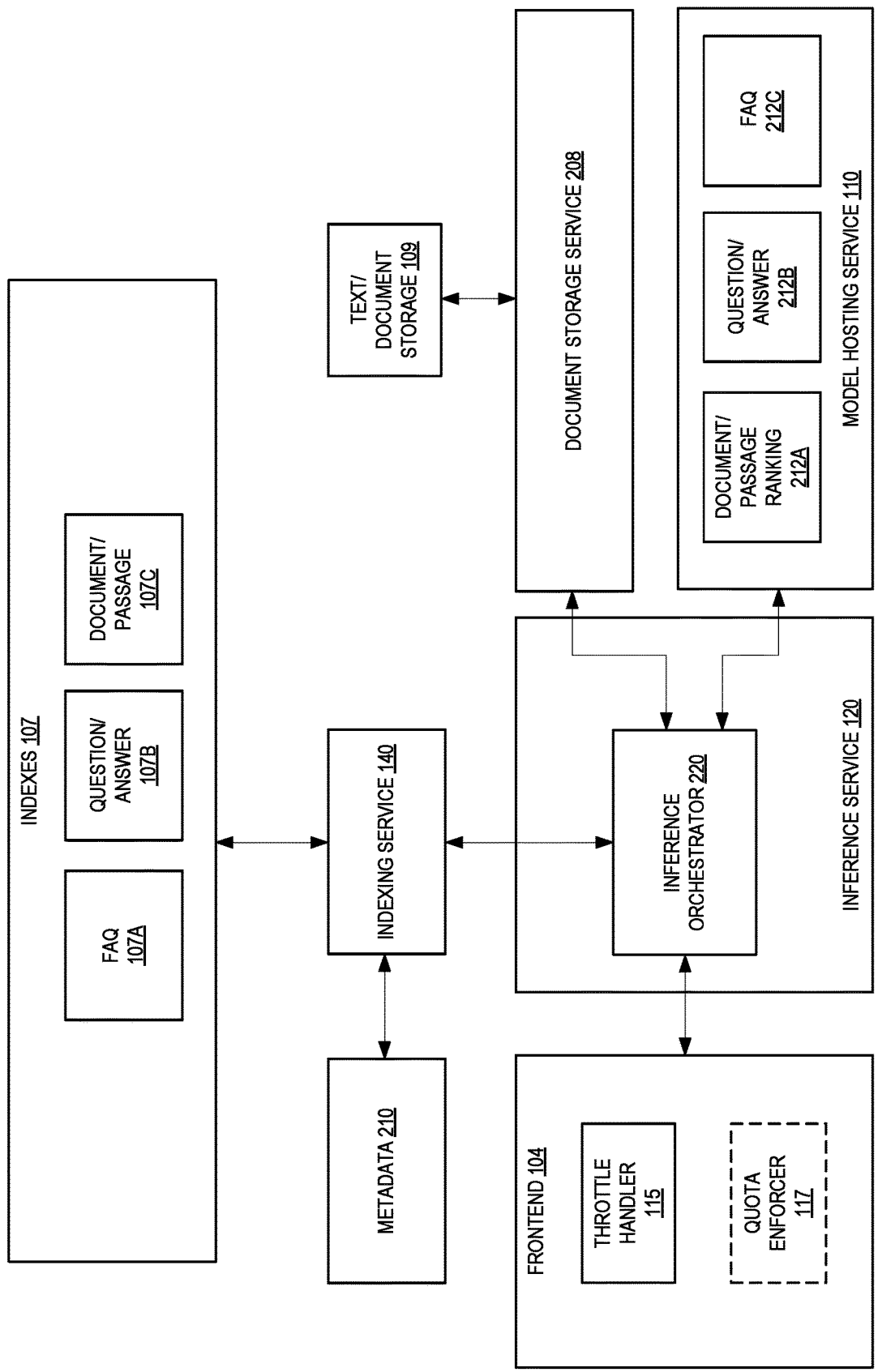
FIG. 2 illustrates embodiments of the enterprise search service used for providing inference functionality.

FIG. 2 illustrates embodiments of the enterprise search service 102 used for providing inference functionality. In particular, the aspects shown may be used to respond to a search query on a set of documents. The frontend 104 takes in a search request (or query), determines using the throttle handler 115 and/or quota enforcer 117 when the request is allowable, and provides allowable request to an inference orchestrator 220 of the inference service 120.

In some embodiments, the query is submitted as an application programming interface (API) call. In some embodiments, a default response to such a query includes a relevant passage, a matching FAQ, and a relevant document. The query may contain one or more fields indicating how the search is to be performed and/or what is to be returned. This one or more fields include, for example, one or more of: an attribute filter field which enables filtered searches based on document attributes; an exclude document attributes field indicating what attributes to exclude from a response; a facets field defining what document attributes to count; an include document attributes field indicating the document attributes to include in a response; an index identifier field indicating the index(es) to search; a page number field indicating the number of pages of results to return; a page size field indicating the size of pages of results to return; a query result type configuration field which sets the type of query (e.g., FAQ, passage, document); a query text field which includes a string of text to search for; and a user context field which identifies the end user making the query so it can be determined if the query result should be filtered based on the user (e.g., an access control list indicates that the user is not allowed to see the content such a regular employee searching for health records of another employee).

The inference orchestrator 220 coordinates various services to perform an inference using the query. In some embodiments, the inference orchestrator 220 includes a state machine or algorithm defining the actions to take. In some embodiments, the inference orchestrator 220 performs query classification and enrichment (or couples to a component that does). For example, in some embodiments, key phrases, entities, syntax, topics, and/or classifications are extracted. In some embodiments, a classifier machine learning model determines what type of question is being presented. Factoid questions and non-factoid questions may get different treatment with respect to what models are used to determine top results and how results are shown.

The inference orchestrator 220 couples to the indexing service 140 and utilizes the indexing service 140 to access one or more indexes 107 to get matching document identifiers for the query. The indexes 107 include a FAQ index 107A, a question/answer index 107B, and a document/passage index 107C. In some instances, the inference orchestrator 220 provides an indication of what index(es) to use. In some embodiments, the metadata 210 provides a physical location of the indexes 107 for the indexing service 140 to use.

The result (e.g., document identifiers) of various index queries are received by the inference orchestrator 220 to use to retrieve one or more documents for use by one or more machine learning models (e.g., FAQ model 212C, question/answer model 212B, and document/passage ranking model(s) 212A) hosted by the model hosting service 110. The inference orchestrator 220 retrieves the identified documents (e.g., an entire document, passage, or FAQ) from text/document storage 109 using document storage service 208. The retrieved documents are then supplied, along with aspects of the query, to one or more of the models 212A-C of the model hosting service 110 to identify one or more of: one or more top ranked documents, one or more top ranked passages, and/or one or more top ranked FAQs. Note that the models 212A-C provide confidence scores of their outputs. Note too that the document storage service 208 stores document artifacts that will be used at the time of inference to extract the answer for a given query.

Figure 3:
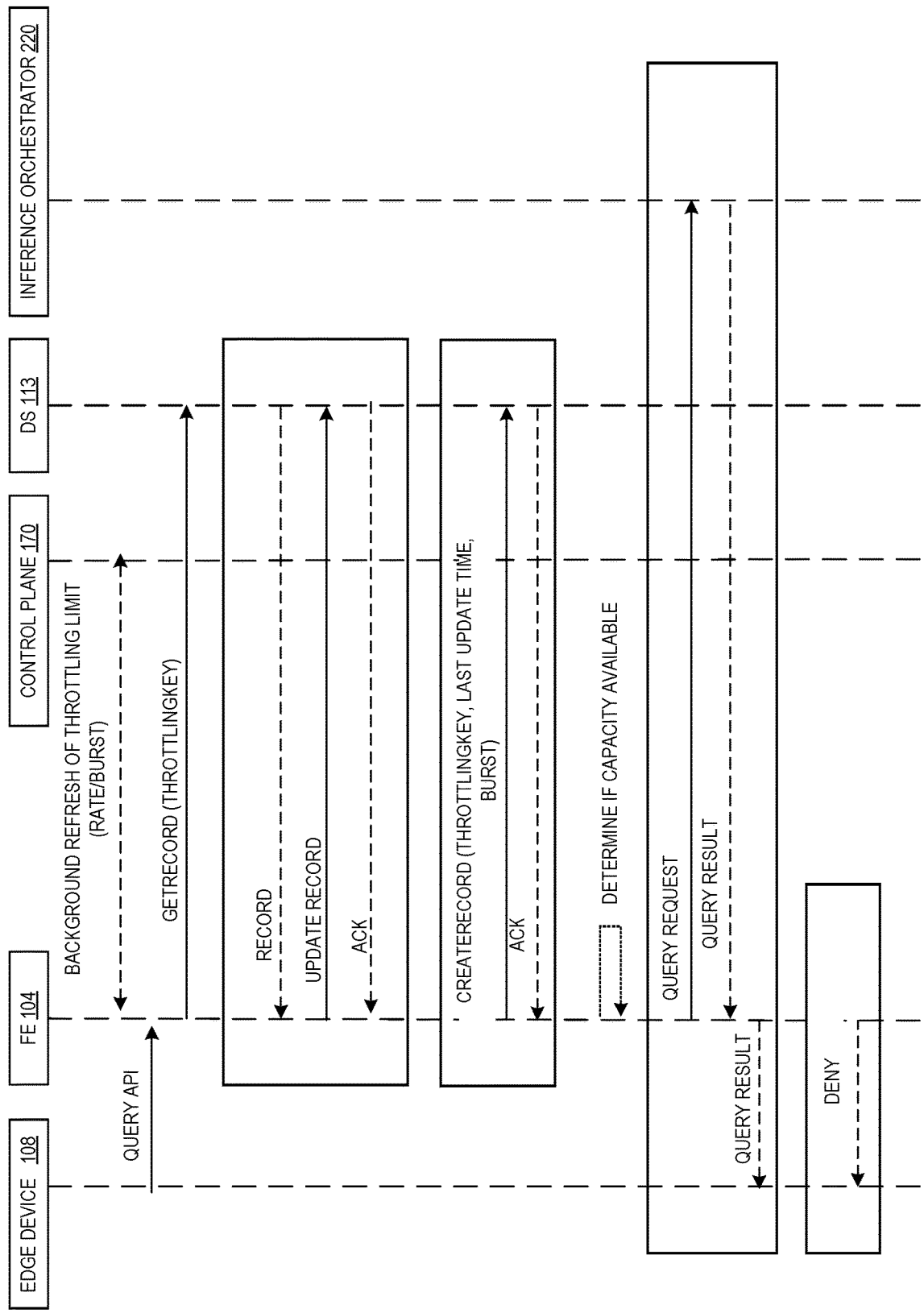
FIG. 3 illustrates a swim diagram showing embodiments of interactions with various components of the provider network.

FIG. 3 illustrates a swim diagram showing embodiments of interactions with various components of the provider network 100. In some embodiments, there is a refresh from the control plane to the frontend 104 of throttling limits (e.g., the limit per API keys).

The edge device 108 sends a request via a query API call to the frontend 104. The frontend 104 (specifically, the throttle handler 115) determines whether this request should be serviced (in this instance, sent to the inference orchestrator 220).

The frontend 104 attempts to get the token bucket record as indexed by the throttling key associated with the API request type for the customer, index, etc. from the data store 113. When the data store 113 has token bucket record it returns it to the frontend 104. The frontend 104 updates the token bucket record in the data store 113 and receives an acknowledgement of the update.

When the data store 113 does not have token bucket record, the frontend 104 creates a token bucket record with a burst value, throttling key, and the current time was the last update time. The burst may be a default value for the particular API or default for all APIs. The front end 104 receives an acknowledgement of the update.

After either the retrieval of a record or creation of a record, the frontend 104 determines if there is capacity available to service the request. When there is capacity, the request is sent to the inference orchestrator 220 which cause the request to be serviced and returns a result which the frontend 104 sends to the requesting device. When there is not capacity, the request is denied.

Figure 4:
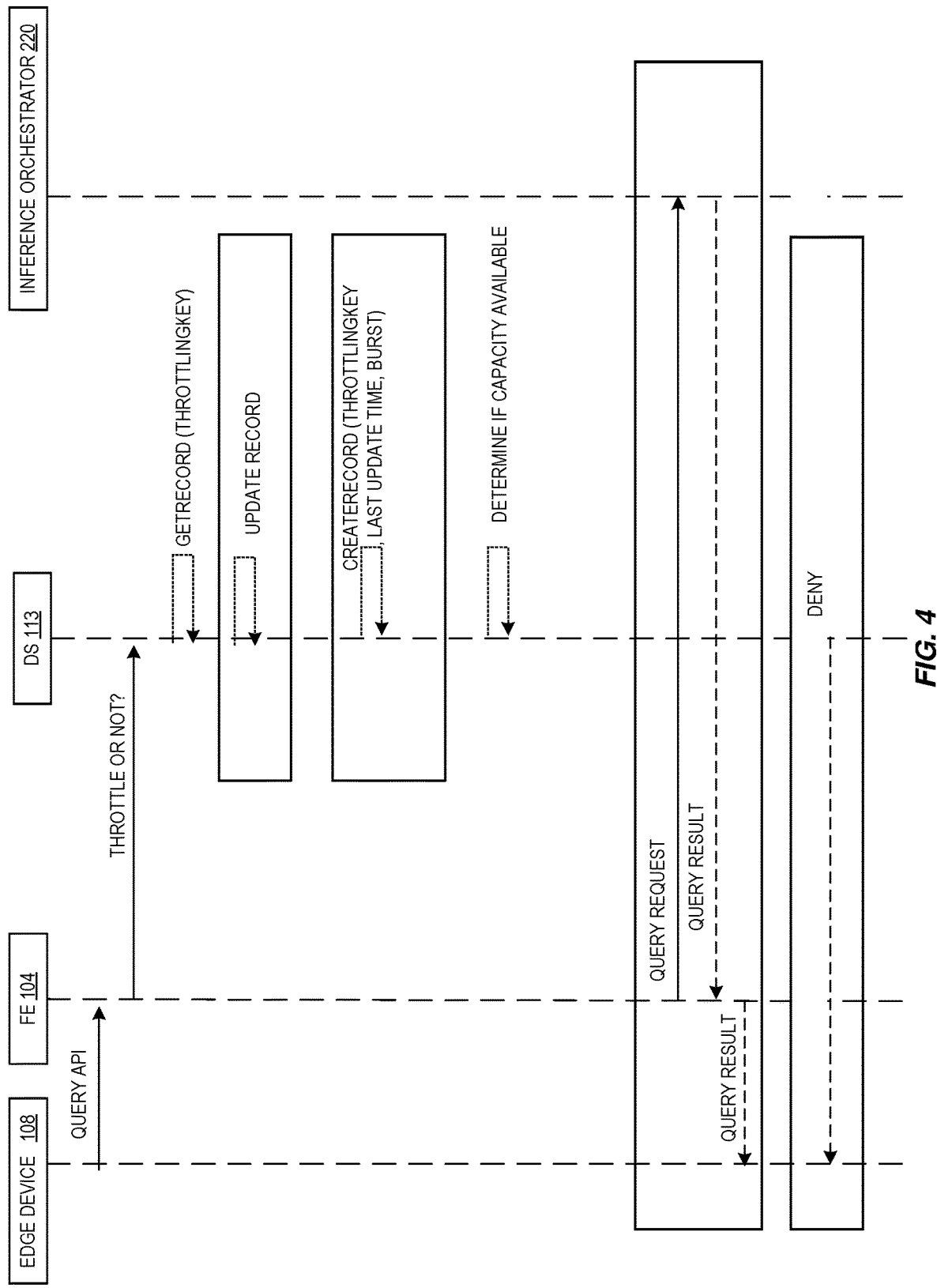
FIG. 4 illustrates a swim diagram showing embodiments of interactions with various components of the provider network.

FIG. 4 illustrates a swim diagram showing embodiments of interactions with various components of the provider network 100. In this example, the data store 103 performs a script or other program to determine whether or not to throttle a request.

The edge device 108 sends a request via a query API call to the frontend 104. The data store 103 determines whether this request should be serviced (in this instance, sent to the inference orchestrator 220).

The data store 103 attempts to get the token bucket record as indexed by the throttling key associated with the API request type for the customer, index, etc. When the data store 113 has token bucket record it determines if there is capacity to service the request. When the data store 113 does not have a token bucket record creates one and then determines if there is capacity to service the request.

When there is capacity, the request is sent to the inference orchestrator 220 which cause the request to be serviced and returns a result which the frontend 104 sends to the requesting device. When there is not capacity, the request is denied.

FIG. 5 illustrates embodiments of a token bucket record. As shown, the token bucket record has a plurality of fields and each field has associated content. One of the fields is a throttling key 501 which has content of a key value that is a string (see above). A token value field 503 has a value (e.g., an integer or float value) representing the maximum burst value. A last update time field 505 stores a time that the record was last updated.

In some embodiments, a token bucket record includes a key expiration field 506 to store an expiration time/date of a key. Additionally, in some embodiments, a capacity unit field 507 stores a maximum limit of a quota (the amount of capacity available) and/or a quota expiration field 509 for the quota. In some embodiments, the key expiration field 506, capacity unit field 507, and quota expiration field 509 are in a token bucket record that is separate from a record having the token value field 503 and/or last update time 505.

Figure 6:
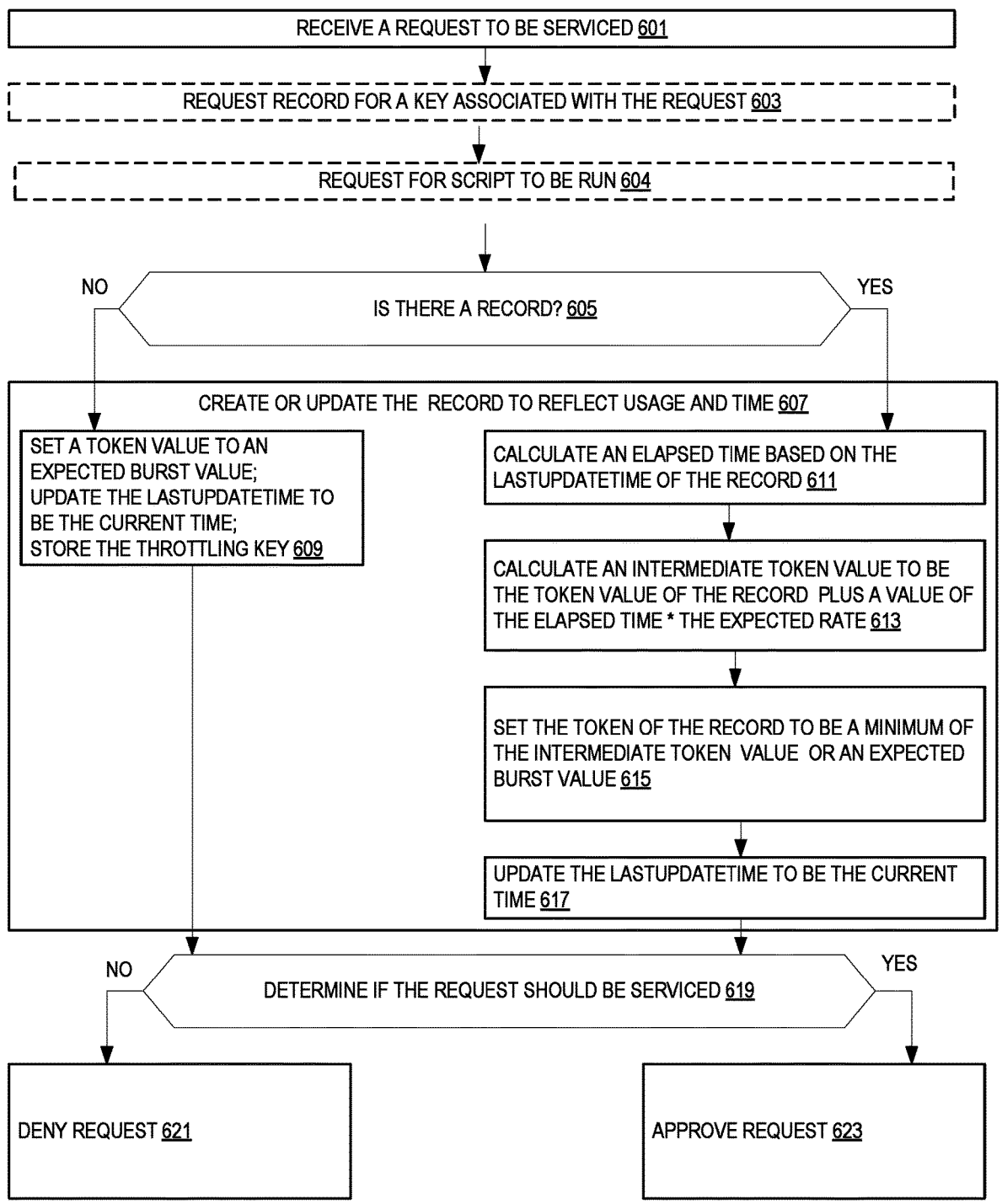
FIG. 6 illustrates embodiments of a method for performing query throttling.

FIG. 6 illustrates embodiments of a method for performing query throttling. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by components of the other figures such as the frontend 104, throttle handler 115, quota enforcer 117, and/or throttle data store 113.

At 601, a request to be serviced is received. A throttle key for the request is generated (if the request does not provide it).

In some embodiments, the key is used to request a token bucket record associated with the request and request type at 603. This is similar to FIG. 3. In other embodiments, a request for a script to be run is made at 604. This is similar to FIG. 4.

A determination of if there is a record is made at 605. Regardless of whether there is a record, there will be an update to a token bucket record, or one created. When there is no existing record, one is created and stored at 609. The token value is set to an expected burst value (e.g., a default burst value) and the last update time is set to be the current time. In some embodiments, an expiration for the key is set at this time (e.g., setting field the expiration field 609).

When there is an existing record, an elapsed time is calculated based on the last update time of the record at 611. For example, the elapsed time is the difference between the last update time of the record and the current time.

An intermediate token value is calculated to be the token value of the record plus a value of the elapsed time multiplied by the expected rate at 613. The intermediate token value is then used to set the token value of the token bucket record to be the minimum of the token of the intermediate token or an expected (default) burst value at 615.

The last update time of the token bucket record is set to be the current time at 617.

At 619, a determination is made of if the request should be serviced. In some embodiments, a request should be serviced when there are enough tokens to service the request (e.g., greater than or equal to the number needed to service the request). Note the number of tokens needed may be a part of the request itself, or known based on the request. When there are enough tokens, the tokens value of the record is set to be the current tokens value minus the number of number of needed tokens. The request is then approved at 623 and sent off. When there are not enough tokens to service the request, tokens are returned to the tokens value and the request is denied at 621. In some embodiments, a capacity per time frame may also be taken into account for approval or denial of a request.

Figure 7:
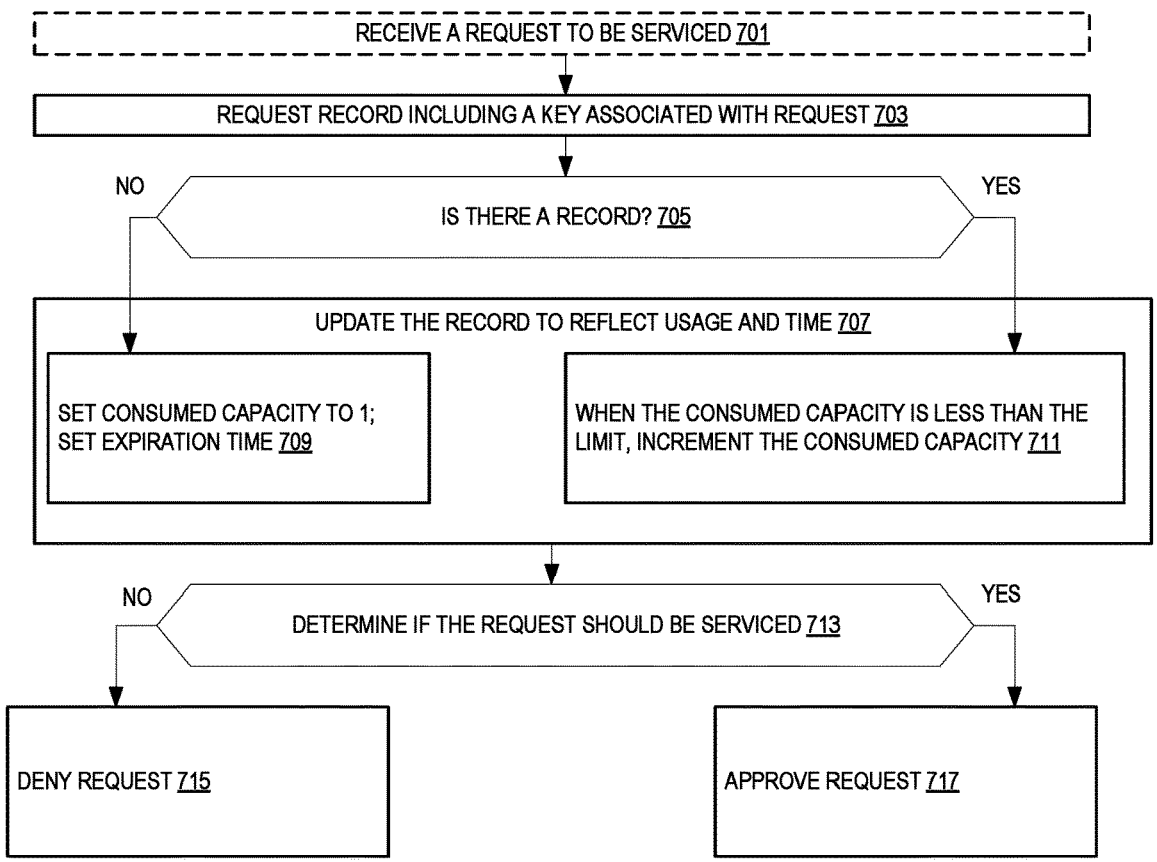
FIG. 7 illustrates embodiments of a method for performing query throttling based on a quota.

FIG. 7 illustrates embodiments of a method for performing query throttling based on a quota. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by components of the other figures such as the frontend 104, throttle handler 115, quota enforcer 117, and/or throttle data store 113.

At 701, a request to be serviced is received, in some embodiments. Note this may have occurred already if the quota determination is a part of the throttling method of FIG. 7.

A quota record including a quota key associated with request and/or requester is attempted to be accessed at 703. The quota record includes a consumed capacity value that is reset after a set amount of time (e.g., hour, day, etc.) has passed as detailed in an expiration time of the record. Note the expiration time may be a part of a record or stored separately.

A determination of if there is such a record is made at 705. The record is updated or created to reflect usage and time 707. When there is no existing record, one is created at 709 with a consumed capacity set to 1 (as in one request has been processed). The expiration time for the record is also set.

When there is not an existing record, when the consumed capacity is less than a set limit (e.g., as set in the capacity unit field) the consumed capacity is incremented at 711.

A determination of if the request should be service is made at 713 based on the consumed capacity. When the consumed capacity is greater than the limit, the request is denied at 715. When the consumed capacity is equal to, or less than, the limit, the request is approved at 717.

Figure 8:
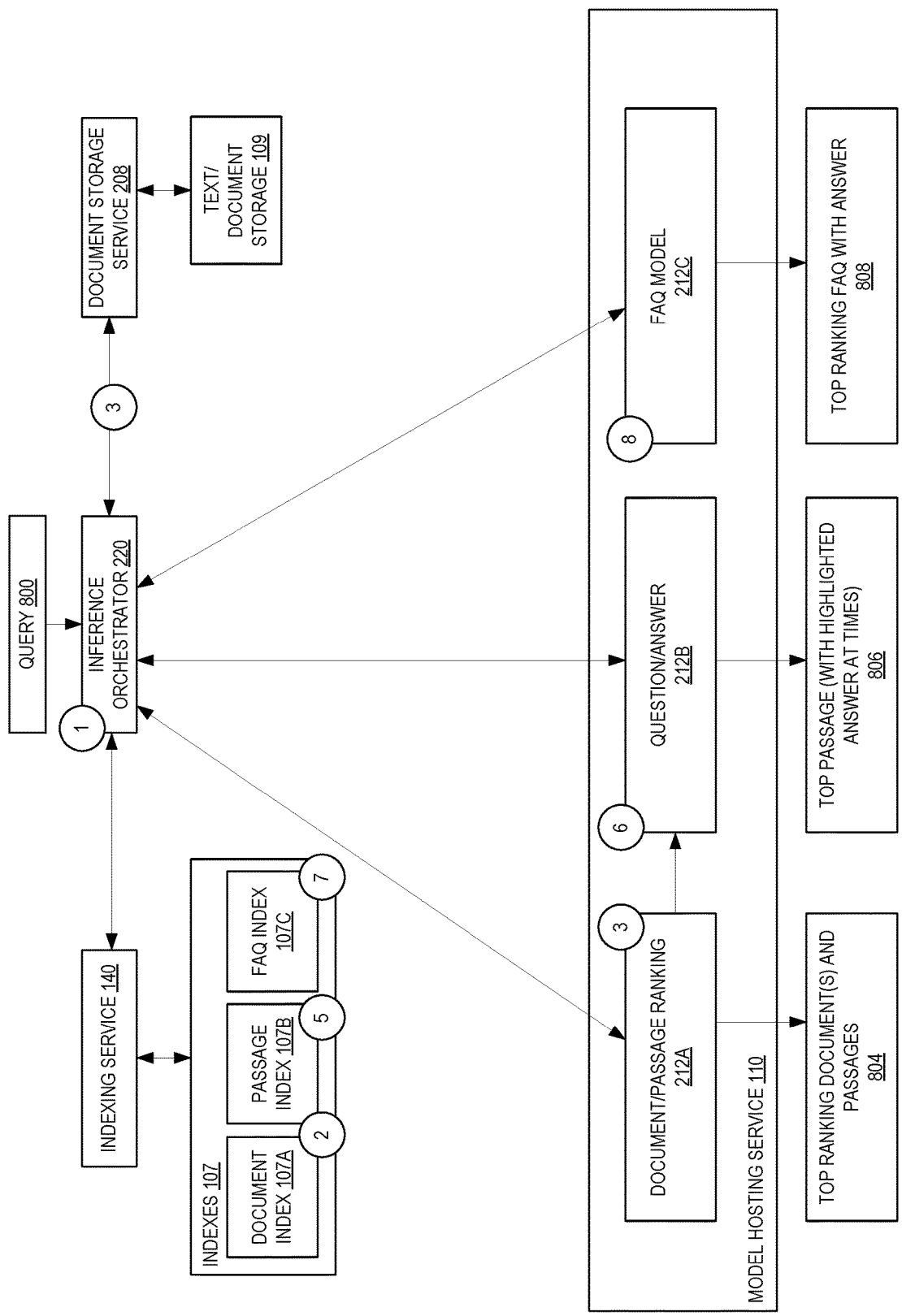
FIG. 8 illustrates embodiments of the enterprise search service used for providing inference functionality.

FIG. 8 illustrates embodiments of the enterprise search service 102 used for providing inference functionality. A query 800 is received by the inference orchestrator 220. This is shown at circle 1. The inference orchestrator 220 fires the query against one or more indexes 107.

In some embodiments, the query is fired against the document index 107A and the passage index 107B (shown at circle 2). An identification of set of "top" documents (e.g., top 1,000 documents) and "top" passages (e.g., 5,000 passages) are provided from the indexing service 140 back to the inference orchestrator 220. The associated documents and passages are retrieved (shown at circle 3) and then sent to the document/passage ranking model(s) 212A.

The document/passage ranking model(s) 212A analyzes and re-ranks the top documents based on relevance scores and, for a top subset (e.g., 100) of the ranked documents, determines a set number (e.g., 3) of passages for each of the top subset of ranked documents (shown at circle 4). In some embodiments, a feature-based deep cross network (DCN) analyzes and re-ranks the top documents. Further, in some embodiments, a bidirectional encoder representations from transformers (BERT) model takes the ranking top subset of documents and finds the passages and outputs relevance scores. The relevance scores of the DCN and BERT are combined to obtain the final reranking of top documents. In some embodiments, when the data is purely textual documents with no metadata fields, then the DCN can be bypassed, and only the BERT used for reranking of the top 100 documents directly. Note that an output of the document/passage ranking model(s) 212A is a set of top ranking document(s) 804 and/or top ranking passages. In some embodiments, the top ranking passages are found using a union of the top ranking documents and the indexed passages.

The question and answer model 212B is used to determine a set of one or more top passages for the query. The query is fired against the passage index 107B at circle 5 to find a top number (e.g., 100) of passages which are retrieved and sent to the document/passage ranking model(s) 212A for analysis and reranking. In particular, in some embodiments, the BERT model receives the top passages and re-ranks the passages and sends top few (e.g., 5) to the question and answer model 212B at circle 6. In some embodiments, the question and answer model 212B is also BERT-based. The question and answer model 212B analyzes these few passages and outputs a top passage 806 that is, at times, highlighted) with multiple answer candidates. In some embodiments, when the top passage's confidence score exceeds a first threshold it is displaced. In some embodiments, when aspects the top passage's confidence score exceeds a second, more stringent threshold, those aspects of the top passage are highlighted as the best answer while less confident scores are otherwise enhanced (e.g., bolded).

The FAQ model 212C is used to determine a set of one or more top FAQs for the query. The query is fired against the FAQ questions index 107C at circle 7 and the top set of matching questions are sent to the FAQ model 212C from the text/document storage 109. The FAQ model 212C re-ranks the top set of questions and returns the most relevant questions along with their answers 808. In some embodiments, the FAQ model 212C is a BERT-based model.

Figure 9:
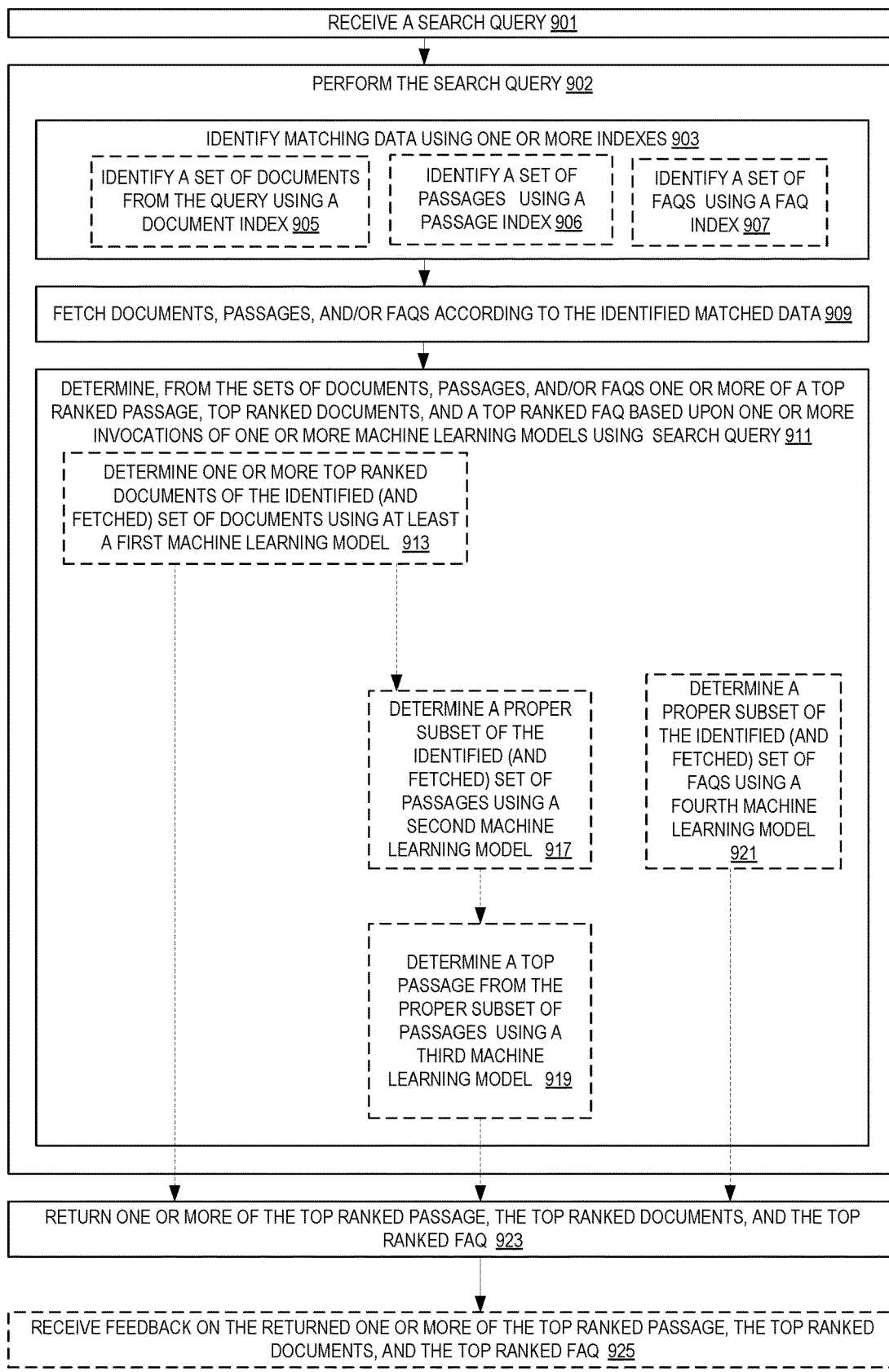
FIG. 9 illustrates embodiments of a method for performing an inference (search on documents).

FIG. 9 illustrates embodiments of a method for performing an inference (search on documents). Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by components of the other figures such as under the control of the inference orchestrator 220 which calls the indexing service 140 for document identifiers, fetches the identified documents using the document storage service 208, and calls one or more ML models in the model hosting service 110 to analyze the fetched documents.

At 901, a search query is received in a frontend. The search query includes a question to be answered. In some embodiments, the search query includes an indication of what type of answer is expected (e.g., a listing of documents, a passage, and/or an FAQ). For example, prefix (or postfix) such as passage:QUESTIONTEXT may be used. Or, a selection from a list of potential results may be used. Examples of a search query API call have been detailed above.

Documents that matches the search query are identified by querying one or more indexes at 903. For example, in some embodiments, an index for documents is queried for a set "top" matching documents at 905, an index for passages is queried for a set of "top" matching passages at 906, and/or an index for FAQs is queried for a set of "top" FAQs at 907. Note that these indexes may be independent of each other or combined in any manner. As noted, an inference orchestrator may cause these one or more queries to occur. In some embodiments, the query is formed such that is requests a "match" for the words of the question. A match query returns documents that match provided text, numbers, dates, or Boolean values. The match query may limit the number of results, the number of words of the question to use, etc.

At 909, the identified documents, passages, and/or FAQs are fetched according to the matched data. As discussed, an inference orchestrator may cause these one or more fetches to occur. The documents, passages, and/or FAQs may be stored in separate locations or together. Additionally, the documents, passages, and/or FAQs may be pre-processed to make subsequent analysis easier. In some embodiments, the fetching is of whole documents. In some embodiments, the fetching is of extracted text from the documents.

One or more of a top ranked passage, top ranked documents, and a top ranked FAQ are determined from the fetched documents, passages, and/or FAQs based upon one or more invocations of one or more machine learning models for the search query at 911. Several operations may occur in this action. Note the models produce a confidence score for their results.

In some embodiments, a proper subset of the identified (fetched) set of documents are determined using a first machine learning model at 913. For example, in some embodiments, the fetched documents are reranked using a first model (e.g., DCN model) according to relevance scores and then a second model (e.g., BERT-based) looks at some top number of those reranked documents (e.g., 100) and uses top passages from the retrieved passages for those top documents to determine a relevance score per document. The relevance scores from the first and second models are combined to generate a set of top ranked documents. In other embodiments, only the reranking using the first model is performed.

In some embodiments, a proper subset of the identified (and fetched) set of passages is identified using a second machine learning model based upon the query and fetched passages at 917. This proper subset is a reranking of the passages This may be the same model as the BERT-based model detailed as being used at 913. This reranked subset is provided to a third model (along with aspects of the query) which determines a top passage from the reranked subset at 919. The third model is a BERT-based model in some embodiments.

In some embodiments, a proper subset of the identified (and fetched) set of FAQS is determined using a fourth machine learning model on the fetched FAQs and the query at 921. This proper subset includes the top ranked FAQ. In some embodiments, the fourth machine learning model is BERT-based.

One or more of the top ranked passage, the top ranked documents, and the top ranked FAQ are returned at 923. The return may include displaying the result. In some embodiments, what is returned is subject to an access control list and/or confidence score threshold. For example, if the top ranked document, etc. is not allowed to be shared with the searching user based on the access control list, then either nothing is returned, or a lower ranked document, etc. is returned instead. In some embodiments, an improved display of the result is utilized. Note that in some embodiments, the returned result is sent back through the frontend and/or inference orchestrator.

At 925, feedback is received on the one or more of the returned one or more of the top ranked passage, the top ranked documents, and the top ranked FAQ in some embodiments. This feedback may be used to tune the models.

Figure 10:
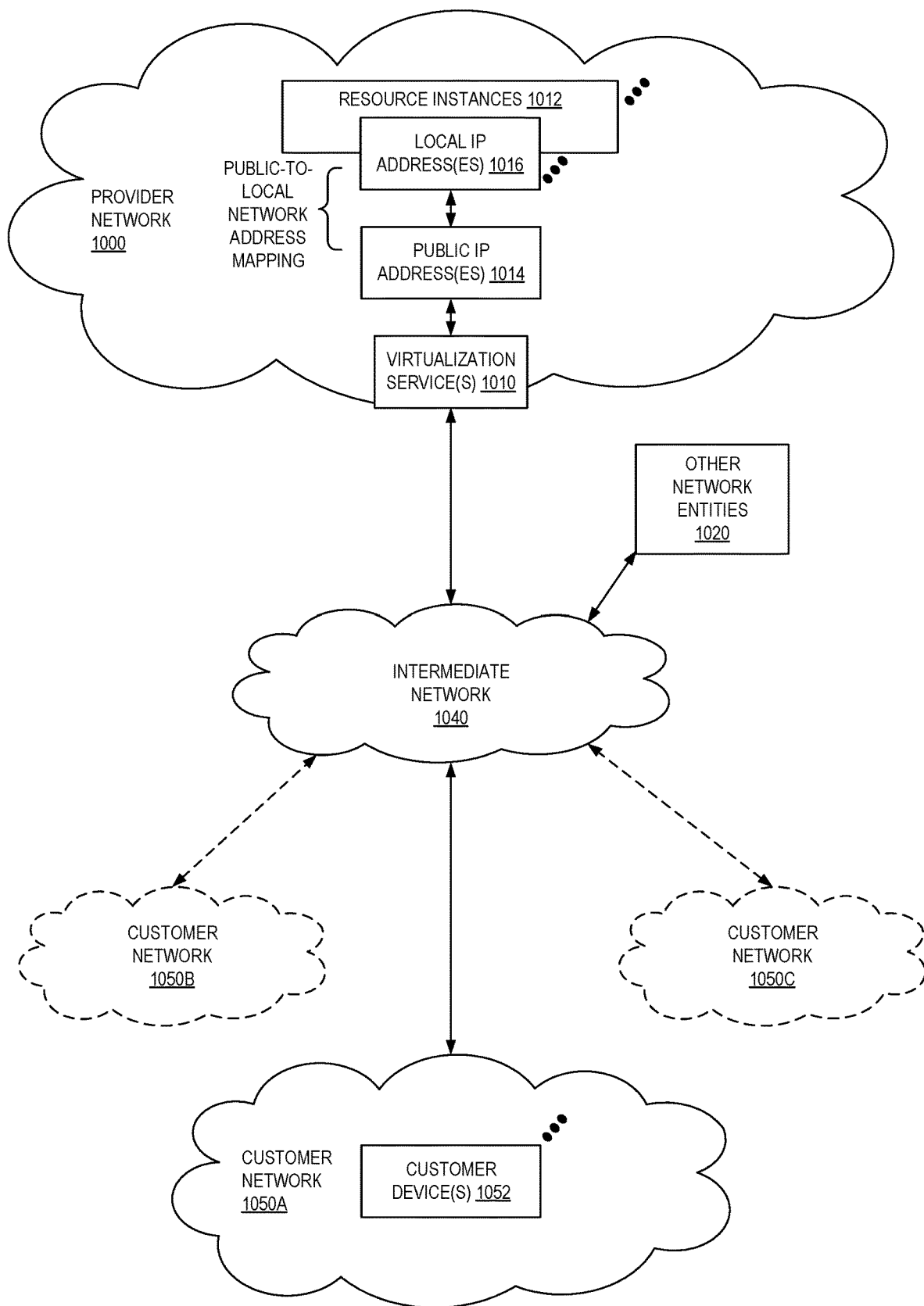
FIG. 10 illustrates an example provider network (or "service provider system") environment according to some embodiments.

FIG. 10 illustrates an example provider network (or "service provider system") environment according to some embodiments. A provider network 1000 may provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 may be associated with the resource instances 1012; the local IP addresses are the internal network addresses of the resource instances 1012 on the provider network 1000. In some embodiments, the provider network 1000 may also provide public IP addresses 1014 and/or public IP address ranges (e.g., Internet Protocol version 4 (IPv4) or Internet Protocol version 6 (IPv6) addresses) that customers may obtain from the provider 1000.

Conventionally, the provider network 1000, via the virtualization services 1010, may allow a customer of the service provider (e.g., a customer that operates one or more client networks 1050A-1050C including one or more customer device(s) 1052) to dynamically associate at least some public IP addresses 1014 assigned or allocated to the customer with particular resource instances 1012 assigned to the customer. The provider network 1000 may also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of customer network(s) 1050A-1050C may, for example, implement customer-specific applications and present the customer's applications on an intermediate network 1040, such as the Internet. Other network entities 1020 on the intermediate network 1040 may then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 may be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1000; a customer may then assign their allocated public IP addresses to particular resource instances allocated to the customer. These public IP addresses may be referred to as customer public IP addresses, or simply customer IP addresses. Instead of being assigned by the provider network 1000 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
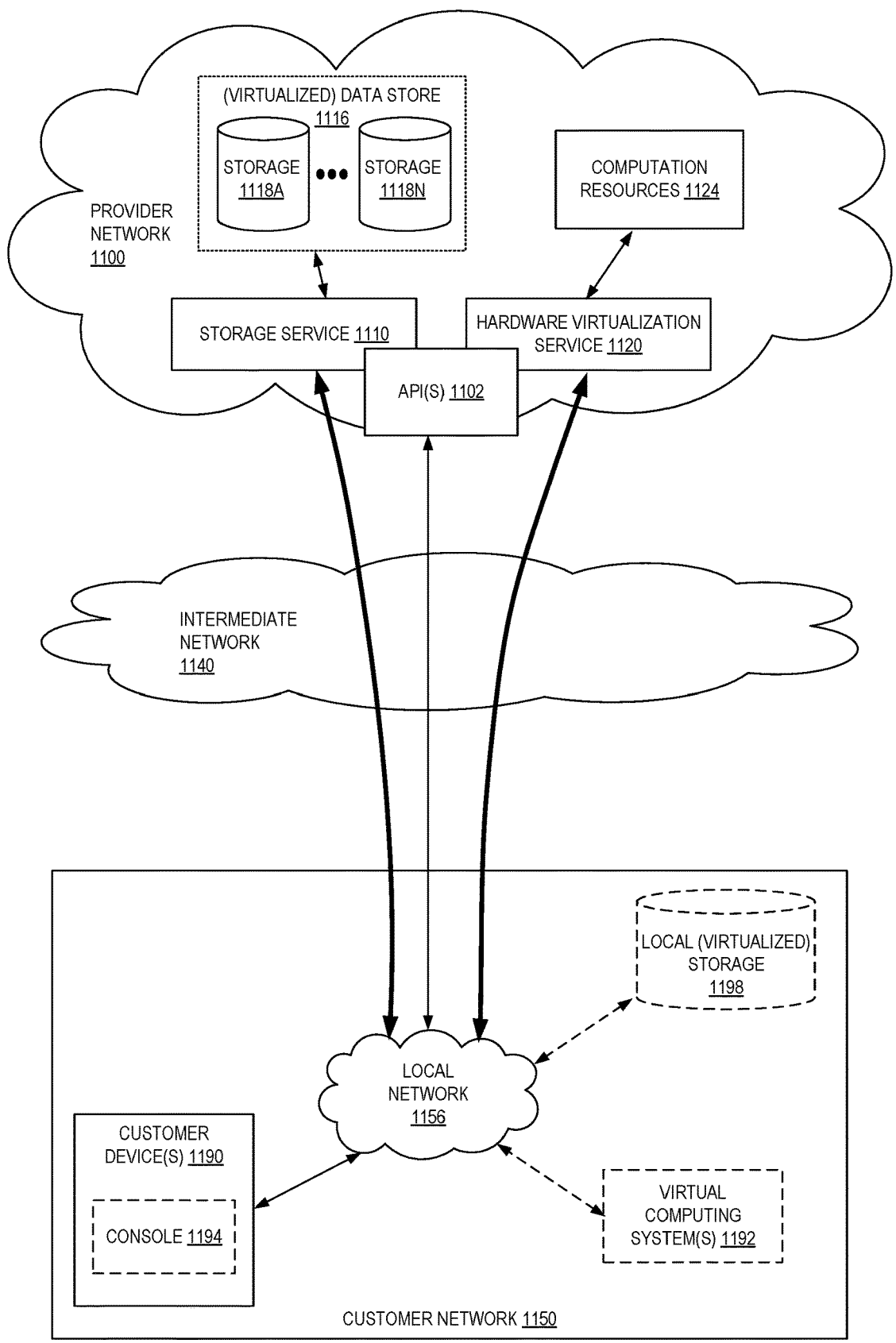
FIG. 11 is a block diagram of an example provider network that provides a storage service and a hardware virtualization service to customers, according to some embodiments.

FIG. 11 is a block diagram of an example provider network that provides a storage service and a hardware virtualization service to customers, according to some embodiments. Hardware virtualization service 1120 provides multiple compute resources 1124 (e.g., compute instances 1125 such as VMs) to customers. The compute resources 1124 may, for example, be rented or leased to customers of the provider network 1100 (e.g., to a customer that implements customer network 1150). Each computation resource 1124 may be provided with one or more local IP addresses. Provider network 1100 may be configured to route packets from the local IP addresses of the compute resources 1124 to public Internet destinations, and from public Internet sources to the local IP addresses of compute resources 1124.

Provider network 1100 may provide a customer network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a customer network 1150 may access functionality provided by the hardware virtualization service 1120, for example via a console 1194 (e.g., a web-based application, standalone application, mobile application, etc.). In some embodiments, at the provider network 1100, each virtual computing system 1192 at customer network 1150 may correspond to a computation resource 1124 that is leased, rented, or otherwise provided to customer network 1150.

From an instance of a virtual computing system 1192 and/or another customer device 1190 (e.g., via console 1194), the customer may access the functionality of storage service 1110, for example via one or more APIs 1102, to access data from and store data to storage resources 1118A-1118N of a virtual data store 1116 (e.g., a folder or "bucket", a virtualized volume, a database, etc.) provided by the provider network 1100. In some embodiments, a virtualized data store gateway (not shown) may be provided at the customer network 1150 that may locally cache at least some data, for example frequently-accessed or critical data, and that may communicate with storage service 1110 via one or more communications channels to upload new or modified data from a local cache so that the primary store of data (virtualized data store 1116) is maintained. In some embodiments, a user, via a virtual computing system 1192 and/or on another customer device 1190, may mount and access virtual data store 1116 volumes via storage service 1110 acting as a storage virtualization service, and these volumes may appear to the user as local (virtualized) storage 1198.

While not shown in FIG. 11, the virtualization service(s) may also be accessed from resource instances within the provider network 1100 via API(s) 1102. For example, a customer, appliance service provider, or other entity may access a virtualization service from within a respective virtual network on the provider network 1100 via an API 1102 to request allocation of one or more resource instances within the virtual network or within another virtual network.

Illustrative Systems

Figure 12:
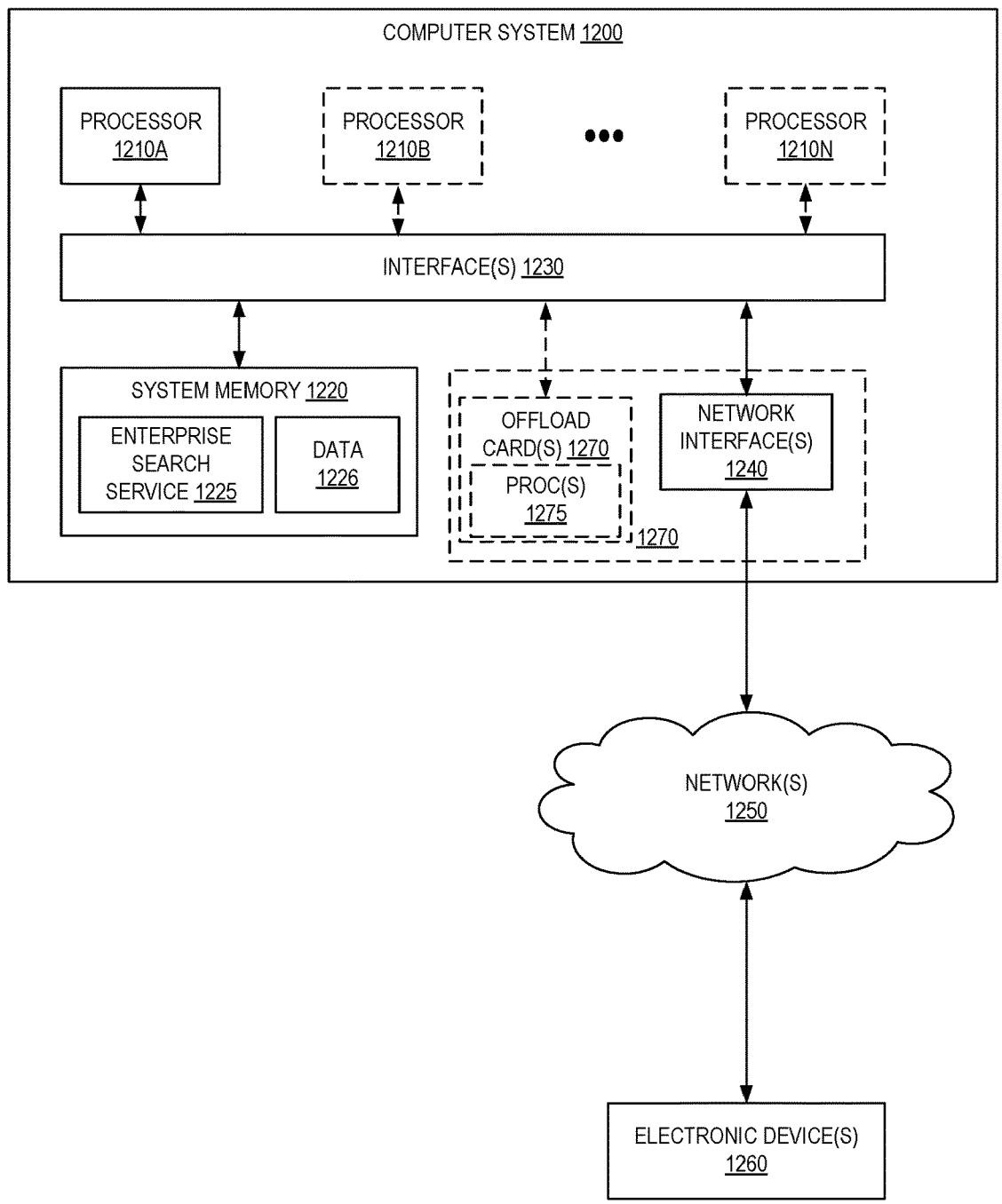
FIG. 12 illustrates embodiments of a computer system.

In some embodiments, a system that implements a portion or all of the techniques described herein may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1220 as enterprise search service code 1225 (e.g., executable to implement, in whole or in part, the enterprise search service 102) and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1200 includes one or more offload cards 1270 (including one or more processors 1275, and possibly including the one or more network interfaces 1240) that are connected using an I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1200 may act as a host electronic device (e.g., operating as part of a hardware virtualization service) that hosts compute resources such as compute instances, and the one or more offload cards 1270 execute a virtualization manager that can manage compute instances that execute on the host electronic device. As an example, in some embodiments the offload card(s) 1270 can perform compute instance management operations such as pausing and/or un-pausing compute instances, launching and/or terminating compute instances, performing memory transfer/copying operations, etc. These management operations may, in some embodiments, be performed by the offload card(s) 1270 in coordination with a hypervisor (e.g., upon a request from a hypervisor) that is executed by the other processors 1210A-1210N of the computer system 1200. However, in some embodiments the virtualization manager implemented by the offload card(s) 1270 can accommodate requests from other entities (e.g., from compute instances themselves), and may not coordinate with (or service) any separate hypervisor.

In some embodiments, system memory 1220 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

The invention claimed is:

1. A non-transitory computer readable storage media storing instructions which, when executed by one or more processors of one or more computing devices, cause the one or more computing devices to perform operations comprising:
   receiving a request of a first type to use a service, the request being one of a plurality of types of requests for a given user;
   based on the request, determining there is a token-based record associated with the request indexed by a key, wherein the token-based record reflects a burst value at a given point in time for the first type of request, wherein the burst value represents a maximum bucket size;

updating the token-based record to reflect usage of the token and a current time value by:
  calculating an elapsed time between a last update time value of the token-based record and the current time value,
  calculating an intermediate token value to be a token value of the token-based record plus a value of the elapsed time multiplied by an expected transaction rate, and
  updating the token-based record by setting the token value to be a minimum of the intermediate token value and an expected burst value, and updating the last update time value to be the current time value;
determining the request should be serviced by verifying the set token value is greater than or equal to a number of tokens needed to perform the request;
sending the request to be performed;
performing the request; and
returning a result of the performing of the request to a user.

2. The non-transitory computer readable storage media of claim 1, wherein the token-based record is stored in an in-memory key-value data store.

3. The non-transitory computer readable storage media of claim 1, wherein the key is generated from an identifier of a user, an identifier of an index that provides search results, and an identifier of the first type of request.

4. A computer-implemented method comprising:
receiving a request of a first type to use a service, the request being one of a plurality of types of requests for a given user;
based on the request, determining there is a token-based record associated with the request indexed by a key, wherein the token-based record reflects a burst value at a given point in time for the first type of request, and wherein the burst value represents a maximum bucket size;
updating the token-based record to reflect usage of the token and a current time value, comprising:
  calculating an elapsed time between a last update time value of the token-based record and the current time value;
  calculating an intermediate token value to be a token value of the token-based record plus a value of the elapsed time multiplied by an expected transaction rate; and
  updating the token-based record by setting the token value to be a minimum of the intermediate token value and an expected burst value, and updating the last update time value to be the current time value;
determining the request is to be serviced by at least verifying a token value of the updated token-based record is greater than or equal to a number of tokens needed to perform the request;
sending the request to be performed;
performing the request; and
returning a result of performing the request.

5. The computer-implemented method of claim 4, wherein the token-based record is stored in an in-memory key-value data store.

6. The computer-implemented method of claim 5, wherein the determining there is a token based record associated with the request, the updating the token-based record to reflect usage of the token and the current time, and the determining the request is to be serviced are performed based on use of the in-memory key-value data store.

7. The computer-implemented method of claim 4, wherein the key is generated from an identifier of a user, an identifier of an index that provides search results, and an identifier of the first type of request.

8. The computer-implemented method of claim 4, wherein the token-based record includes a string value for the key, a numeric value for the token value, and a numeric value for the last update time of the record.

9. The computer-implemented method of claim 4, wherein the determining the request is to be serviced further comprises:
determining a consumed capacity associated with the first type of request has not exceeded a threshold over a set time period.

10. The computer-implemented method of claim 9, wherein the consumed capacity is stored in a record that additionally includes an expiration time for the time period.

11. The computer-implemented method of claim 10, where in the record is the token-based record.

12. The computer-implemented method of claim 10, where in the record is stored separately from the token-based record.

13. The computer-implemented method of claim 4, wherein the first type is a document search query.

14. The computer-implemented method of claim 4, wherein the request includes a question to be answered, and wherein the method further comprises receiving a result generated based on performance of the request, wherein the result includes an answer to the question.

15. A system comprising:
a data storage to store a set of documents; and
one or more electronic devices to implement a search service, the search service including instructions that upon execution cause the search service to:
  receive a request by the search service to search the stored set of documents,
  based on the request, determine there is a token-based record associated with the request indexed by a key, wherein the token-based record reflects a burst value at a given point in time for the first type of request, and wherein the burst value represents a maximum bucket size,
  update the token-based record to reflect usage of the token and a current time value, the update comprising:
    calculating an elapsed time between a last update time value of the token-based record and the current time value,
    calculating an intermediate token value to be a token value of the token-based record plus a value of the elapsed time multiplied by an expected transaction rate, and
    updating the token-based record by setting the token value to be a minimum of the intermediate token value and an expected burst value, and updating the last update time value to be the current time value,
  determine the request is to be serviced by at least verifying a token value of the updated token-based record is greater than or equal to a number of tokens needed to perform the request,
  send the request to be performed,
  perform the request, and
  return a result of performing the request.

16. The system of claim 15, wherein the token-based record is stored in an in-memory key-value data store.

17. The system of claim 16, wherein to determine there is a token-based record associated with the request; to update the token-based record to reflect usage of the record and a current time; and to determine the request is to be serviced the search service is to utilize the in-memory key-value data store.

18. The system of claim 15, wherein the request includes a question to be answered, and wherein the search service is further to transmit a result generated based on a performance of the request, wherein the result includes an answer to the question.

19. The system of claim 15, wherein the documents comprise at least one of word processing documents, text files, or postscript-based files.

20. The system of claim 15, wherein the key is generated from an identifier of a user, an identifier of an index that provides search results, and an identifier of the first type of request.

* * * * *